United States Patent
Taniguchi

(10) Patent No.: US 11,926,320 B2
(45) Date of Patent: Mar. 12, 2024

(54) VEHICLE TRAVEL CONTROL METHOD AND VEHICLE TRAVEL CONTROL DEVICE

(71) Applicant: Nissan Motor Co., Ltd., Yokohama (JP)

(72) Inventor: Yohei Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 261 days.

(21) Appl. No.: 17/609,847

(22) PCT Filed: Apr. 21, 2020

(86) PCT No.: PCT/JP2020/017234
§ 371 (c)(1),
(2) Date: Nov. 9, 2021

(87) PCT Pub. No.: WO2020/230551
PCT Pub. Date: Nov. 19, 2020

(65) Prior Publication Data
US 2022/0219692 A1 Jul. 14, 2022

(30) Foreign Application Priority Data
May 15, 2019 (JP) .................................. 2019-092431

(51) Int. Cl.
*B60W 30/14* (2006.01)
*B60W 60/00* (2020.01)
*G06V 20/56* (2022.01)

(52) U.S. Cl.
CPC ........ *B60W 30/143* (2013.01); *B60W 60/001* (2020.02); *G06V 20/56* (2022.01);
(Continued)

(58) Field of Classification Search
CPC ... B60W 2050/0096; B60W 2420/403; B60W 2420/42; B60W 2552/53; B60W 2556/40;
(Continued)

(56) References Cited

U.S. PATENT DOCUMENTS

2010/0082251 A1  4/2010  Kogure
2013/0135472 A1*  5/2013  Wu ...................... G07C 5/0866
                                              348/148
(Continued)

FOREIGN PATENT DOCUMENTS

CN        104411558 A    3/2015
EP         2871107 A1    5/2015
(Continued)

*Primary Examiner* — Babar Sarwar
(74) *Attorney, Agent, or Firm* — Young Basile Hanlon & MacFarlane, P.C.

(57) ABSTRACT

An autonomous speed control function for autonomously controlling a traveling speed of the vehicle and an autonomous steering control function for autonomously controlling steering of the vehicle include executing first autonomous control where, when an external situation of the vehicle is recognizable from a captured image by a camera on the vehicle, the vehicle is autonomously controlled using information recognized from the captured image; executing second autonomous control in which information indicating the external situation of the vehicle is acquired from stored map information provided in the vehicle and the vehicle is autonomously controlled using the acquired information; specifying an unrecognizable area in which the external situation of the vehicle is unrecognizable from the captured image; and when the unrecognizable area is present on a travel route of the vehicle, switching from the first autonomous control to the second autonomous control before the vehicle enters the unrecognizable area.

6 Claims, 9 Drawing Sheets

(52) U.S. Cl.
CPC ..... *B60W 2420/42* (2013.01); *B60W 2556/40* (2020.02); *B60W 2710/20* (2013.01); *B60W 2720/10* (2013.01)

(58) Field of Classification Search
CPC ......... B60W 2710/20; B60W 2720/10; B60W 30/12; B60W 30/143; B60W 50/06; B60W 50/082; B60W 60/001; B62D 15/025; B62D 15/0255; G06V 20/56; G08G 1/167
See application file for complete search history.

(56) References Cited

U.S. PATENT DOCUMENTS

| | | |
|---|---|---|
| 2015/0134204 A1 | 5/2015 | Kunihiro et al. |
| 2018/0066956 A1* | 3/2018 | Kim ........................ G06F 16/29 |
| 2018/0151066 A1 | 5/2018 | Oba |
| 2019/0049981 A1* | 2/2019 | Fischer ................ G05D 1/0088 |
| 2019/0061808 A1* | 2/2019 | Mizoguchi ............. G01C 21/26 |
| 2019/0163993 A1* | 5/2019 | Koo ..................... G06V 20/588 |
| 2021/0407290 A1 | 12/2021 | Oba |

FOREIGN PATENT DOCUMENTS

| | | | |
|---|---|---|---|
| JP | 2010-083312 A | | 4/2010 |
| JP | 2016194816 A | * | 11/2016 |
| JP | 2017-041070 A | | 2/2017 |
| JP | 2018-073010 A | | 5/2018 |
| JP | 2019-038396 A | | 3/2019 |

* cited by examiner

VEHICLE TRAVEL CONTROL METHOD AND VEHICLE TRAVEL CONTROL DEVICE

CROSS-REFERENCE TO RELATED APPLICATION(S)

The present application claims priority to Japanese Patent Application No. 2019-92431 filed on May 15, 2019, the entire disclosure of which is hereby incorporated by reference.

TECHNICAL FIELD

The present invention relates to a travel control method and a travel control apparatus for a vehicle that include autonomous travel control.

BACKGROUND

A driving assist device for a vehicle is known, which is configured to set a target steering wheel angle for controlling a subject vehicle to travel along a travel lane (JP2019-38396A). In this device, when a determination is made that a camera unit fails to recognize the right and left compartment lines of a travel route of the subject vehicle, a map curvature stored for the travel lane on a road map of the subject vehicle is read, and an estimated lateral position deviation is obtained based on the map curvature, a preceding curvature, and the vehicle speed of the subject vehicle. The preceding curvature is based on the travel trajectory of a tracking object preceding vehicle. The estimated lateral position deviation is added to the lateral position of the subject vehicle to set the above target steering wheel angle.

SUMMARY

According to the above prior art, however, the map curvature is read from the road map data base after a determination is made that the camera fails to recognize the right and left compartment lines, and therefore the switching from the vehicle control using the recognition result of the camera to the vehicle control using the data of the road map database is delayed. Thus, there is a problem in that the behavior of the vehicle becomes large.

A problem to be solved by the present invention is to provide a travel control method and a travel control apparatus for a vehicle that are able to suppress the behavior of the vehicle when switching the autonomous control of the vehicle.

The present invention solves the above problem through, when an unrecognizable area is present on the travel route of a vehicle, switching from autonomous control of the vehicle using information recognized from a camera image to autonomous control of the vehicle using map information of a storage medium before the vehicle enters the unrecognizable area.

According to the present invention, the behavior of the vehicle can be suppressed when switching the autonomous control of the vehicle.

DETAILED DESCRIPTION

Figure 1:
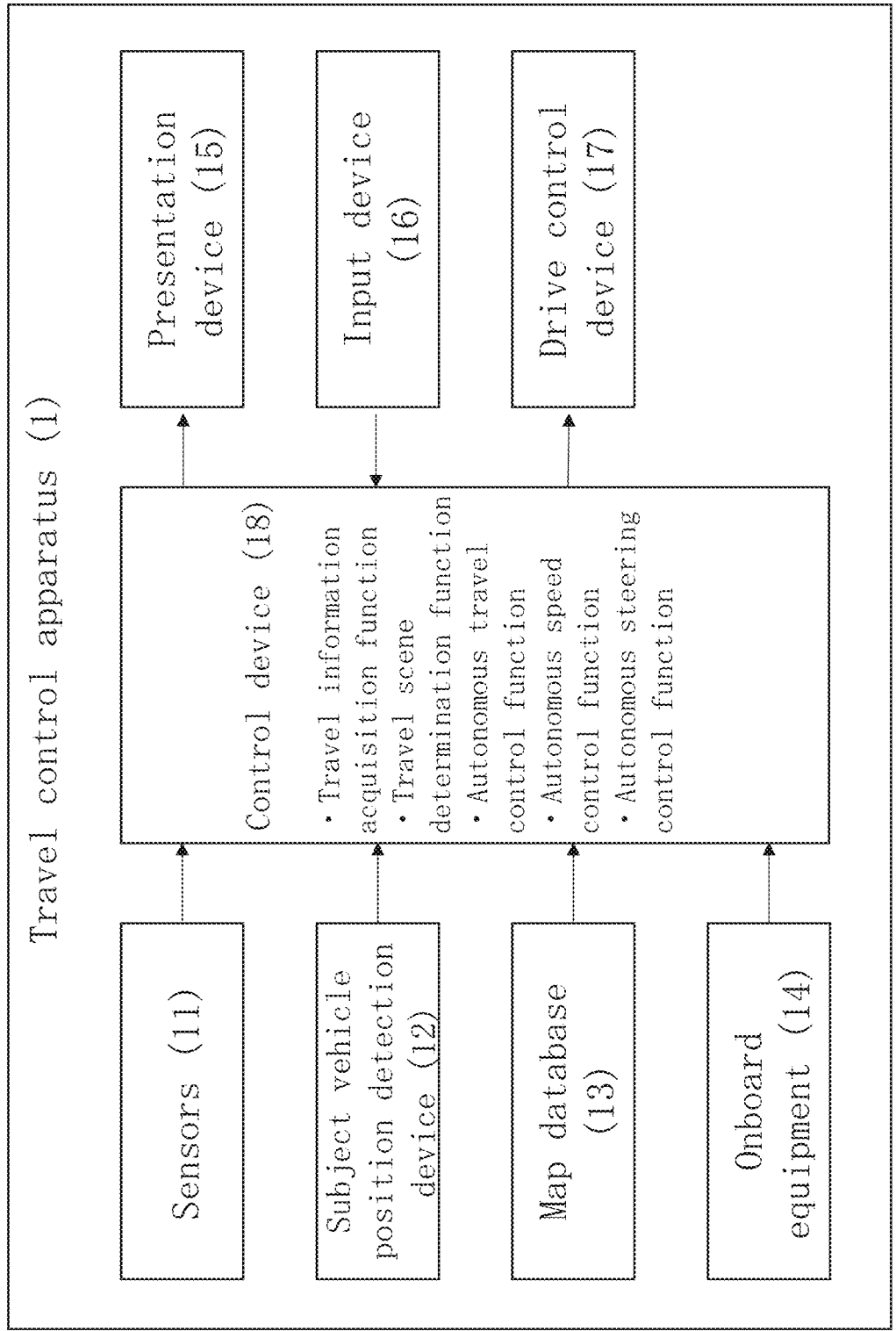
FIG. 1 is a block diagram illustrating an embodiment of the travel control apparatus for a vehicle according to the present invention.

FIG. 1 is a block diagram illustrating the configuration of a travel control apparatus 1 for a vehicle according to an embodiment of the present invention. The travel control apparatus 1 for a vehicle according to the present embodiment represents an embodiment for carrying out the travel control method for a vehicle according to the present invention. As illustrated in FIG. 1, the travel control apparatus 1 for a vehicle according to the present embodiment includes sensors 11, a subject vehicle position detection device 12, a map database 13, onboard equipment 14, a presentation device 15, an input device 16, a drive control device 17, and a control device 18. These devices are connected to one another, for example, via a controller area network (CAN) or other onboard LAN for mutually exchanging information.

The sensors 11 detect a traveling state of a subject vehicle. Examples of the sensors 11 include, for example, a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, a touch sensor (capacitance sensor) that detects whether or not the driver holds the steering wheel, an onboard camera that captures images of the driver, etc. The sensors 11 may be represented by one of the above-described various sensors or may also be configured as a combination of two or more sensors. The detection results of the sensors 11 are output to the control device 18 at predetermined time intervals.

The subject vehicle position detection device 12 is composed of a GPS unit, a gyro-sensor, a vehicle speed sensor, etc. The subject vehicle position detection device 12 detects radio waves transmitted from a plurality of communication satellites using the GPS unit to periodically acquire the positional information of a target vehicle (subject vehicle) and detects the current position of the target vehicle based on the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 18 at predetermined time intervals.

The map database 13 is a memory that stores three-dimensional high-precision map information including positional information of various facilities and specific points and is accessible from the control device 18. The three-dimensional high-precision map information stored in the map database 13 is three-dimensional map information based on the road shape detected when traveling on an actual road using a vehicle for data acquisition, and in the three-dimensional map information, detailed and highly precise positional information items, such as a curved route and the size of the curve (e.g., curvature or radius of curvature), a merging point and a branching point of a road, a tollgate, a position at which the number of lanes is reduced, and a service area/parking area, are associated with the map information as the three-dimensional information.

The onboard equipment 14 includes various modules equipped in the vehicle and is operated by the driver's operation. Examples of such onboard equipment include a steering wheel, an accelerator pedal, a brake pedal, a navigation device, direction indicators, wipers, lights, a horn, and other specific switches. When the driver operates the onboard equipment 14, its operation information is output to the control device 18.

The presentation device 15 is represented, for example, by devices such as a display of a navigation device, a display incorporated in a rearview mirror, a display incorporated in a meter unit, a head-up display projected on a windshield, a speaker of an audio device, and a seat device with embedded vibrating bodies. The presentation device 15 informs the driver of presentation information and lane change information, which will be described later, under the control by the control device 18.

Figure 2:
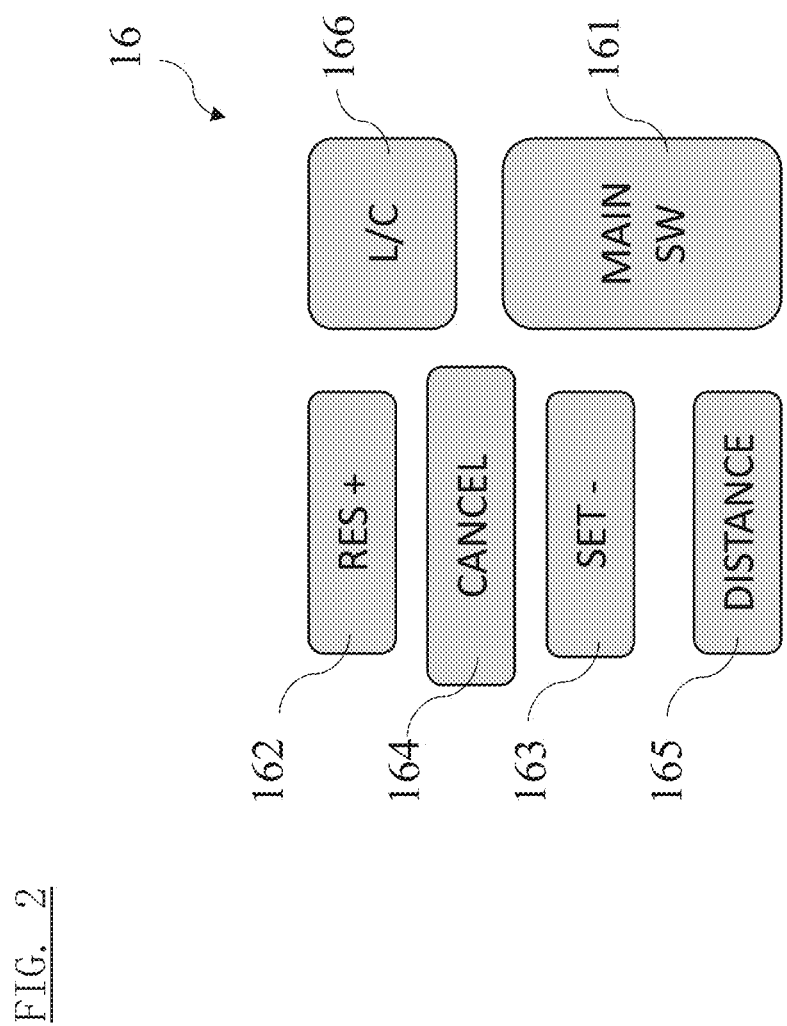
FIG. 2 is a front view illustrating a part of the input device of FIG. 1.

The input device 16 is, for example, a device such as a button switch or a touch panel disposed on a display screen with which the driver can input information by the manual operation or a microphone with which the driver can input information by the voice. In the present embodiment, the driver can operate the input device 16 thereby to input setting information in response to the presentation information which is presented by the presentation device 15. FIG. 2 is a front view illustrating a part of the input device 16 of the present embodiment and represents an example including a set of button switches arranged on a spoke part or the like of the steering wheel. The illustrated input device 16 includes button switches used when setting ON/OFF of an autonomous speed control function and an autonomous steering control function of the control device 18, and the button switches include a main switch (MAIN SW) 161, a resume/acceleration switch (RES +) 162, a set/coast switch (SET −) 163, a cancel switch (CANCEL) 164, an inter-vehicle distance adjustment switch (DISTANCE) 165, and a lane change assist switch (L/C) 166.

The main switch 161 is a switch for turning ON/OFF the power source of the system which achieves the autonomous speed control function and autonomous steering control function of the control device 18. The resume/acceleration switch 162 is a switch for turning OFF the operation of the autonomous speed control function and then resuming the autonomous speed control function at the set speed before the OFF state, for increasing the set speed, and/or for following a preceding vehicle to stop and then restarting. The set/coast switch 163 is a switch for starting the autonomous speed control function at the speed when traveling and/or lowering the set speed. The cancel switch 164 is a switch for turning OFF the autonomous speed control function. The inter-vehicle distance adjustment switch 165 is a switch for setting the inter-vehicle distance from a preceding vehicle and is, for example, a switch for selecting one from a plurality of stages of settings such as short distance/medium distance/long distance. The lane change assist switch 166 is a switch for instructing (accepting) the start of a lane change when the control device 18 confirms the start of the lane change with the driver.

Additionally or alternatively to the set of button switches illustrated in FIG. 2, switches of the direction indicators or other onboard equipment 14 can also be used as the input device 16, and a configuration can be adopted in which the driver turns on the switch of the direction indicators in response to an inquiry from the control device 18 as to whether or not to perform a lane change in an automated or autonomous manner and inputs the acceptance or permission for the lane change. The setting information input with the input device 16 is output to the control device 18.

The drive control device 17 controls travel of the subject vehicle. For example, when the subject vehicle travels at a constant set speed or travels to follow a preceding vehicle using the autonomous speed control function, the drive control device 17 controls the operation of the drive mechanism (including the operation of an internal-combustion engine in the case of an engine car or the operation of an electric motor for travel in the case of an electric car and also including the torque distribution for an internal-combustion engine and an electric motor for travel in the case of a hybrid car) and the brake operation for achieving the acceleration/deceleration and the traveling speed so that the speed of the subject vehicle becomes the set speed or, when there is a preceding vehicle, the inter-vehicle distance between the subject vehicle and the preceding vehicle becomes a constant distance. Additionally or alternatively, when the autonomous steering control function is used to perform the lane keeping control for detecting lane marks of a lane in which the subject vehicle travels (also referred to as a subject vehicle lane, hereinafter) and controlling the traveling position of the subject vehicle in the road width direction so that the subject vehicle travels, for example, at the center in the subject vehicle lane, or when a lane change assist function, an overtaking assist function, or a route traveling assist function is used for the subject vehicle to perform automated lane change control such as overtaking of a preceding vehicle or a change of the traveling direction, or when a right or left turn assist function is used to perform travel control for turning right or left at an intersection or the like, the steering control of the subject vehicle is executed by controlling the operation of the steering actuator in addition to the operation of the drive mechanism and the brake operation for achieving the acceleration/deceleration and the traveling speed. The drive control device 17 controls the travel of the subject vehicle in accordance with instructions from the control device 18, which will be described below. Any of other known methods can also be used as the travel control method executed by the drive control device 17.

The control device 18 is composed of a read only memory (ROM) that stores programs for controlling the travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit.

The control device 18 executes the programs stored in the ROM using the CPU (processor) thereby to achieve a travel information acquisition function for acquiring information regarding a traveling state of the subject vehicle and an autonomous travel control function for autonomously controlling the traveling speed and/or steering of the subject vehicle (the autonomous travel control function includes an autonomous speed control function for autonomously controlling the traveling speed of the subject vehicle and an autonomous steering control function for autonomously controlling the steering of the subject vehicle).

The travel information acquisition function of the control device 18 is a function used for acquiring the travel information regarding the traveling state of the subject vehicle. For example, the control device 18 uses the travel information acquisition function to acquire as the travel information the external image information around the vehicle captured by the front camera and rear camera included in the sensors 11 and/or the detection results by the front radar, rear radar, and side radars included in the sensors 11. Additionally or alternatively, the control device 18 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

Additionally or alternatively, the control device 18 uses the travel information acquisition function to acquire as the travel information the current positional information of the subject vehicle from the subject vehicle position detection device 12. Additionally or alternatively, the control device 18 uses the travel information acquisition function to acquire as the travel information the positional information of curved routes and the size of the curve (e.g., curvature or radius of curvature), merging points, branching points, tollgates, positions at which the number of lanes decreases, service areas (SAs)/parking areas (PAs), etc. from the map database 13. In addition, the control device 18 uses the travel information acquisition function to acquire as the travel information the information on an operation of the onboard equipment 14 performed by the driver from the onboard equipment 14.

Figure 3:
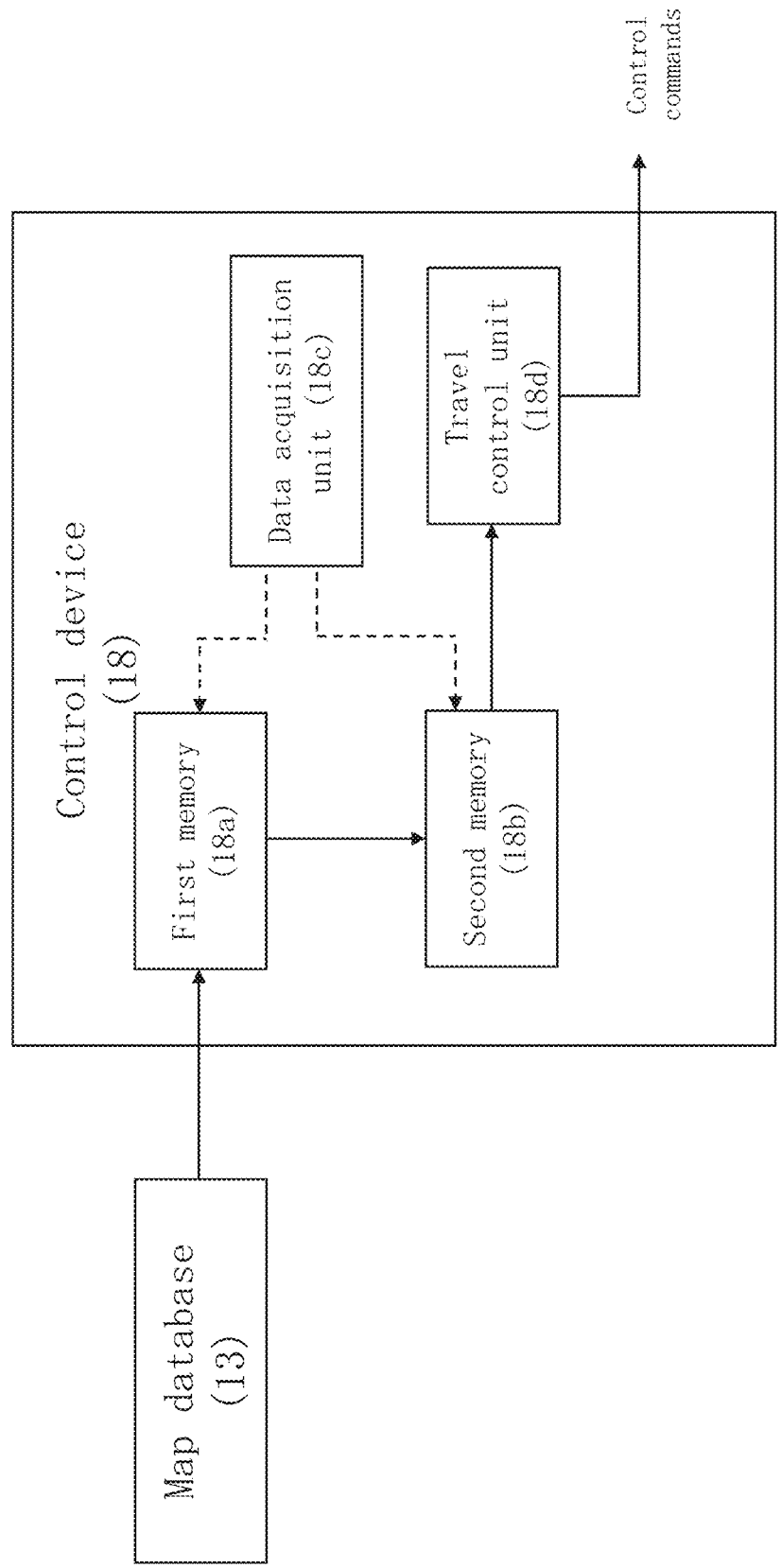
FIG. 3 is a block diagram of the map database and control device of FIG. 1.

Here, the travel information acquisition function will be described with reference to FIG. 3. FIG. 3 is a block diagram of the map database 13 and the control device 18. The control device 18 has a first memory 18a, a second memory 18b, a data acquisition unit 18c, and a travel control unit 18d. The first memory 18a is a memory that temporarily stores data acquired from the map database 13. The storage capacity of the first memory 18a is smaller than the storage capacity of the map database 13. The second memory 18b is a memory that temporarily stores data acquired from the first memory 18a. The storage capacity of the second memory 18b is smaller than the storage capacity of the first memory 18a.

The data acquisition unit 18c represents a functional block of the travel information acquisition function. The data acquisition unit 18c saves and deletes data for the first memory 18a and the second memory 18b. In addition, the data acquisition unit 18c acquires data necessary for the autonomous control from the data stored in the second memory 18b in accordance with the traveling state of the subject vehicle and outputs the acquired data to the travel control unit 18d. The travel control unit 18d represents a functional block of the autonomous travel control function.

The map database 13 stores data of a specific area such as all over Japan. The data stored in the map database 13 is used for route search in the navigation system. The data acquisition unit 18c stores, in the first memory 18a, the road information within a predetermined range with respect to the current position of the subject vehicle among the map information stored in the map database 13. For example, the data acquisition unit 18c stores, in the first memory 18a, the road information from the current position of the subject vehicle to a predetermined distance (e.g., 2 km) ahead. The vehicle information stored in the first memory 18a includes information on a lane center line, a lane mark (white line), a speed limit, a sign, etc.

In addition, the data acquisition unit 18c stores, in the second memory 18b, the road information within a predetermined range with respect to the current position of the subject vehicle among the road information stored in the first memory 18a. For example, the data acquisition unit 18c stores, in the second memory 18b, the road information from the current position of the subject vehicle to a predetermined distance (e.g., 1 km) ahead. When the road information from the current position of the subject vehicle to a predetermined distance ahead is stored in the first memory 18a and the second memory 18b, the predetermined distance for the storage in the second memory 18b is shorter than that for the storage in the first memory 18a.

The data acquisition unit 18c acquires only the road information necessary for the autonomous control among the road information stored in the second memory 18b and outputs the acquired road information to the travel control unit 18d. In this operation, when the travel road of the vehicle can be limited among a plurality of lanes, the data acquisition unit 18c selectively acquires the road information of the road on which the vehicle travels, and outputs the acquired road information to the travel control unit 18d. In other words, when the travel road of the vehicle can be limited among a plurality of lanes, the data acquisition unit 18c extracts the road information stored in the second memory 18b and outputs the extracted road information to the travel control unit 18d.

The data acquisition unit 18c limits the travel road of the vehicle from a plurality of lanes based on the driver's operation and/or the travel route. For example, provided that the road is branched ahead of the current position of the subject vehicle, when the driver operates the blinkers to flash the blinker lamps on the left side, the data acquisition unit 18c limits the left-side road from the branched roads.

The description will be made for an exemplary case in which a travel route is set such that vehicles leave the tollgate from a highway and heads for a general road and the subject vehicle is approaching an interchange. In such a case, when the driver operates the blinkers before the lane change section in order to head for the road branched from the main road (road separated from the main road and connected to the tollgate), the travel road of the vehicle can be limited. The road information of the main road and the road information of the branched road are stored in the second memory 18b, and the data acquisition unit 18c selectively acquires the road information of the branched road with a trigger of the flashing blinkers and outputs the selected road information to the travel control unit 18d.

Thus, when the road is branched ahead of the current position of the subject vehicle and the travel road of the subject vehicle can be limited based on the traveling state of the vehicle, the driver's steering, the travel route, etc., the data acquisition unit 18c selectively acquires the road information and outputs it to the travel control unit 18d. Road information of a lane having no relation with the autonomous control of the subject vehicle is not input to the travel control unit 18d, but the road information necessary for the autonomous control of the subject vehicle is input, and the calculation load in the travel control unit 18d can therefore be alleviated.

The autonomous travel control function of the control device 18 is a function used for autonomously controlling the travel of the subject vehicle without depending on the driver's operation and includes an autonomous speed control function used for autonomously controlling the traveling speed of the subject vehicle and an autonomous steering control function used for autonomously controlling the steering of the subject vehicle. The autonomous speed control function and autonomous steering control function of the present embodiment will be described below.

«Autonomous Speed Control Function»

The autonomous speed control function is a function used, when detecting a preceding vehicle, for traveling to follow the preceding vehicle while performing the inter-vehicle distance control so as to maintain the inter-vehicle distance in accordance with the vehicle speed with an upper limit of the vehicle speed that is set by the driver, and is also a function used, when detecting no preceding vehicle, for performing constant speed traveling at a vehicle speed that is set by the driver. The former is also referred to as inter-vehicle distance control while the latter is also referred to as constant speed control. The autonomous speed control function may include a function used, when detecting the speed limit of a travel lane using the travel information acquisition function, for automatically adopting the speed of the speed limit sign as a set vehicle speed.

To activate the autonomous speed control function, the driver first operates the resume/acceleration switch 162 or set/coast switch 163 of the input device 16 illustrated in FIG. 2 to input a desired traveling speed. For example, when the set/coast switch 163 is pressed while the subject vehicle is traveling at 70 km/h, the current traveling speed is set without any modification, but if the speed desired by the driver is 80 km/h, the resume/acceleration switch 162 may be pressed a plurality of times to increase the set speed. On the contrary, if the speed desired by the driver is 60 km/h, the set/coast switch 163 may be pressed a plurality of times to decrease the set speed. The inter-vehicle distance desired by the driver may be selected, for example, from a plurality of stages of settings such as short distance/medium distance/long distance by operating the inter-vehicle distance adjustment switch 165 of the input device 16 illustrated in FIG. 2.

In the constant speed control, the drive control device 17 controls the operation of the drive mechanism such as the engine and the brake while using the sensors 11 such as the front radar, which detects an obstacle ahead of the subject vehicle, to detect that there is no preceding vehicle ahead of the subject vehicle in its travel lane and while feeding back the vehicle speed data obtained by the vehicle speed sensor so as to maintain the traveling speed which is set by the driver.

In the inter-vehicle distance control, the drive control device 17 controls the operation of the drive mechanism such as the engine and the brake while using the sensors 11 such as the front radar, which detects an obstacle ahead of the subject vehicle, to detect that there is a preceding vehicle ahead of the subject vehicle in its travel lane and detect the inter-vehicle distance (the preceding vehicle in this case is a vehicle located just ahead of the subject vehicle) and while feeding back the inter-vehicle distance data detected by the sensors 11 (front radar) so as to maintain the inter-vehicle distance, which is set by the driver, with an upper limit of the traveling speed that is set by the driver. If the preceding vehicle stops while the subject vehicle is traveling under the inter-vehicle distance control, the subject vehicle also stops following the preceding vehicle, and if the preceding vehicle starts within 30 seconds after the subject vehicle stops, the subject vehicle also starts traveling to follow the preceding vehicle again by the inter-vehicle distance control. If the subject vehicle stops for more than 30 seconds, the subject vehicle does not start in an automated or autonomous manner even when the preceding vehicle starts, and after the preceding vehicle starts, the subject vehicle starts traveling to follow the preceding vehicle again by the inter-vehicle distance control when the resume/acceleration switch 162 is pressed or the accelerator pedal is depressed.

«Autonomous Steering Control Function»

The autonomous steering control function is a function used for controlling the operation of the steering actuator thereby to execute the steering control of the subject vehicle. This autonomous steering control function includes: a lane keeping function (lane width direction maintenance function) in which the steering is controlled so as to travel, for example, near the center of the lane to assist the driver's steering operation; a lane change assist function in which when the driver operates the blinker lever, the steering is controlled to assist the steering wheel operation necessary for changing lanes; an overtaking assist function in which when a vehicle slower than the set vehicle speed is detected ahead, a display is used for confirmation by the driver as to whether to perform an overtaking operation, and when the driver operates an acceptance switch, the steering is controlled to assist the overtaking operation; a route traveling assist function in which when the driver inputs the destination to the navigation device or the like and arrives at a lane change point required to travel along the route, a display is used for confirmation by the driver as to whether to perform a lane change, and when the driver operates an acceptance switch, the steering is controlled to assist the lane change; and other functions.

Figure 4A:
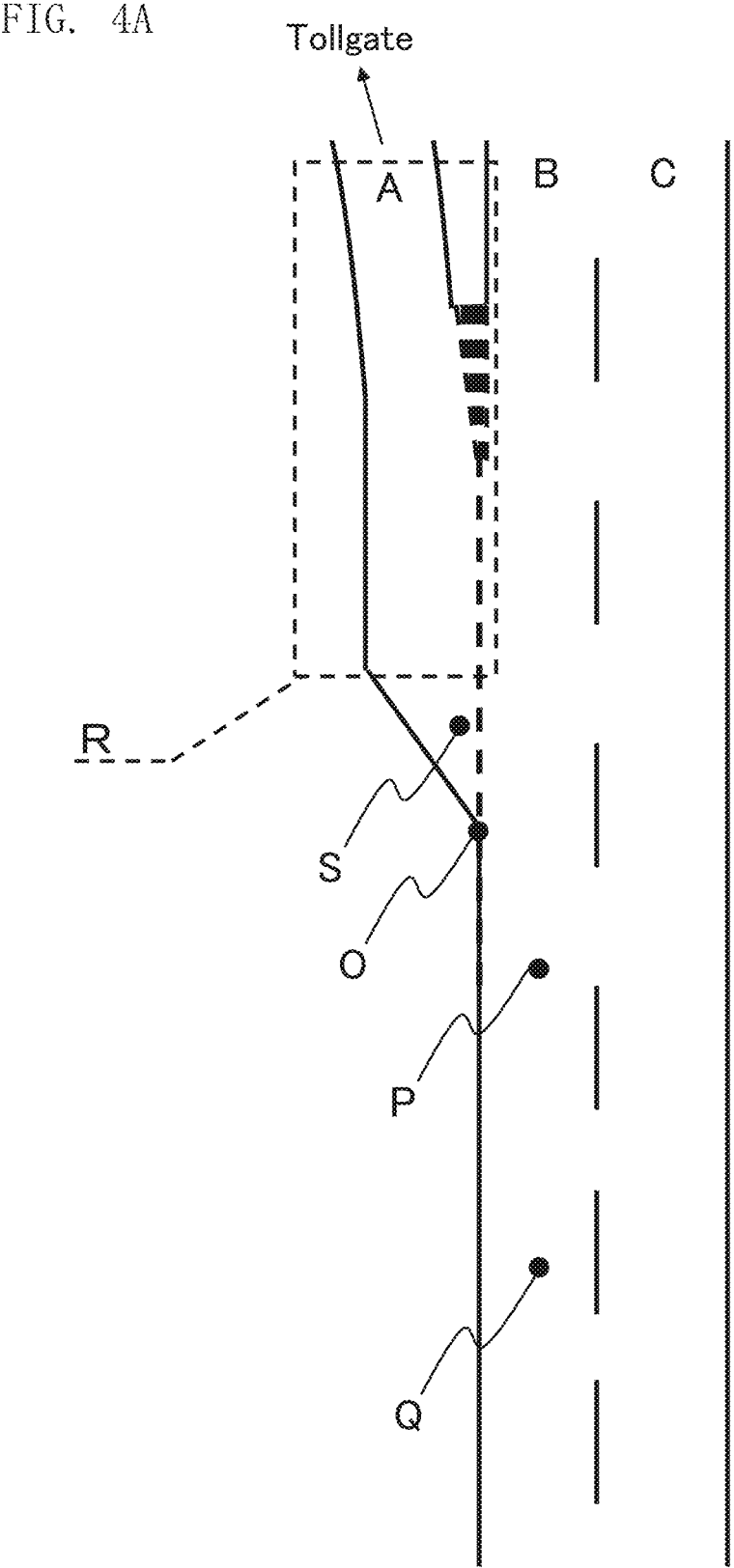
FIG. 4A is a diagram for describing travel trajectories and target points when traveling from a main road to a branching lane of a branching road.
Figure 4B:
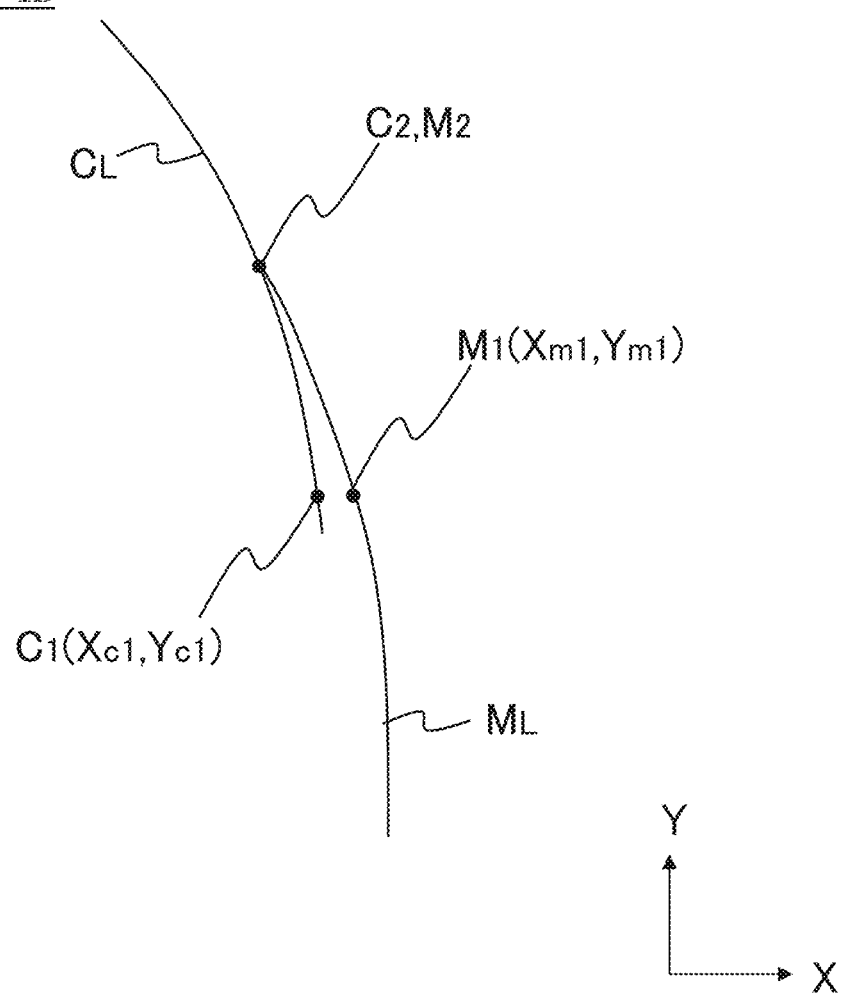
FIG. 4B is a schematic diagram illustrating a part of the travel trajectories and target points of FIG. 4A.

The route traveling assist function is a function used, when the travel route to a destination is set, for controlling the steering, the vehicle speed, and the blinkers so that the subject vehicle travels along the travel route. FIG. 4A is a diagram for describing travel trajectories and target points when traveling from a main road to a branching lane of a branching road. FIG. 4B is a schematic diagram illustrating a part of the travel trajectories and target points of FIG. 4A. In FIGS. 4A and 4B, the X-axis represents the coordinate axis in the lateral direction (vehicle width direction) of the vehicle, and the Y-axis represents the coordinate axis in the vehicle traveling direction on the main road.

The description will be made for the route traveling assist function, for example, when a travel route is set for traveling at an interchange from the main road of an expressway to a tollgate via a branching lane. As illustrated in FIG. 4A, a lane A is a branching lane connecting the main road to the tollgate. The main road includes lanes B and C, and the lane C is the overtaking lane.

When the destination is set by the user or the like, the control device 180 calculates the travel route to the destination. The control device 180 executes the lane keeping function and the lane change function to travel along the travel route. The control device 180 executes each function based on the information recognized from the camera image and the map information stored in the database 13. The information recognizable from the camera image represents an actual travel environment, and therefore when the lane marks can be recognized from the camera image, the control device 180 preferentially uses the information recognized from the camera image to autonomously control the vehicle. In the branching road as illustrated in FIG. 4A, a dotted boundary line is painted between the main road and the branching lane, but many vehicles heading from the main road to the branching lane travel across this boundary line, so a part of the boundary line has disappeared, and the lane marks may not be recognized from the camera image. Additionally or alternatively, the shape of an interchange is different depending on the location, and the road shape of the branching lane is complicated; therefore, the lane marks may not be recognized from the camera image when traveling on the branching road. In order to travel along the travel route in such an area in which the lane marks cannot be recognized, the control device 180 autonomously controls the vehicle based on the map information stored in the database 13.

In the present embodiment, an area in which a feature to be recognized for the autonomous control, such as a lane mark and/or an obstacle, cannot be recognized from the camera image is preliminarily specified as an unrecognizable area. The unrecognizable area represents an area in which the external situation of the vehicle cannot be recognized from the camera image. Information on the size and position of the unrecognizable area is preliminarily stored in the map database 13. The control device 180 refers to the map database 13 to determine whether or not there is an unrecognizable area on the travel route calculated in the vehicle. When there is an unrecognizable area on the travel route, the vehicle is to travel in the unrecognizable area. In the unrecognizable area, the lane keeping function cannot serve using the information recognized from the camera image, and the control device 180 therefore executes the lane keeping function and/or the lane change function using the road information stored in the map database as substitute for the camera image. That is, when the vehicle is not traveling in the unrecognizable area, the control device 180 autonomously controls the vehicle using the information recognized from the camera image, while when the vehicle is traveling in the unrecognizable area, the control device 180 autonomously controls the vehicle using the road information stored in the map database as substitute for the camera image.

When switching from the autonomous control based on the camera image (also referred to as camera control, hereinafter) to the autonomous control based on the map information (also referred to as map control, hereinafter), if the autonomous control is switched after confirming that a feature located ahead of the vehicle is unrecognizable from the camera image, the behavior of the vehicle may become large. The autonomous control of the vehicle includes setting target points on a travel trajectory of the vehicle and controlling the steering so that the position of the vehicle passes the target points. The travel trajectory of the vehicle is calculated by computation, and when the camera image is used, for example, the center line between the recognized right and left lane marks is set as the travel trajectory (target trajectory) of the vehicle. On the other hand, when the map information is used, the center line of the lane included in the map information is set as the travel trajectory of the vehicle. Each target point is set at a position separated from the current position of the subject vehicle by a predetermined traveling time (e.g., 1.25 seconds). When a deviation between the lane marks recognized from the camera image and the lane marks stored in the map information is large, the deviation of the target points is also large. Therefore, when switching the information used for the autonomous control from that of the camera control to that of the map control after confirming that the feature is unrecognizable from the camera image, the behavior of the vehicle may become large due to the delay in switching the autonomous control mode and/or the deviation of the target points.

In the present embodiment, the unrecognizable area is preliminarily specified, and when performing the autonomous control of the vehicle, the autonomous control based on the camera image is switched to the autonomous control based on the map information before the vehicle enters the unrecognizable area.

In the example illustrated in FIG. 4A, the control device 180 specifies a predetermined area R including a branching road as the unrecognizable area. The unrecognizable area A includes at least a boundary line between the main road and the branching lane and a part of the branching lane.

The control device 180 sets a lane change start point P because it is necessary to change lanes from the main road to the branching lane at the branching road of the interchange. The lane change start point is a point at which the steering control is started so that the vehicle moves in the lateral direction (vehicle width direction). When the subject vehicle is traveling in the lane B, the control device 180 sets the lane change start point P on the lane B. The lane change start point P is set at a position before a point O, at which the branching lane starts, by a predetermined distance. When the subject vehicle is traveling in the lane B, the lane change start point P is set on the lane B. When the subject vehicle is traveling in the lane C, respective lane change start points are set on the lane B and the lane C. In the traveling direction of the vehicle, the distance from the lane change start point set on the lane C to the lane change start point set on the lane B is set longer than the distance from the lane change start point set on the lane B to the point O at which the branching lane starts. When the vehicle is traveling in the overtaking lane C, it is necessary to change lanes twice before traveling in the branching lane, and therefore a longer predetermined distance for setting the lane change start point on the lane C is provided thereby to allow the lane changes to have a margin.

The control device 180 sets an intention confirmation point Q for confirming the user's intention to change lanes, at a position before the lane change start point P by a predetermined distance. At the timing when the subject vehicle reaches the intention confirmation point Q, the control device 180 makes a confirmation as to whether to change lanes to the driver by a display on the display. When the driver operates the acceptance switch, the data acquisition unit 18c of the control device 180 acquires the road information of the lane A, which is the branching lane, and does not acquire the road information of the lanes B and C. Alternatively, when the driver operates the blinkers in the same direction as the lane change direction, the data acquisition unit 18c of the control device 180 acquires the road information of the lane A, which is the branching lane, and does not acquire the road information of the lanes B and C. The timing at which the data acquisition unit 18c of the control device 180 acquires the road information of the lane A may be when starting the flashing of the blinkers or may otherwise be after starting the flashing of the blinkers. The flashing of the blinkers starts at the timing when the subject vehicle reaches the lane change start point P, and the data acquisition unit 18c of the control device 180 may therefore acquire the information on the lane A in association with the flashing of the blinkers.

On the other hand, when the driver does not operate the acceptance switch or when the driver operates the blinkers in the direction opposite to the lane change direction, a determination is made that there is no intention to change lanes, and the data acquisition unit 18c of the control device 180 acquires the road information of the lanes B and C included in the main road and does not acquire the road information of the lane A. The lane B is included in the same road as the road on which the vehicle is currently traveling.

The control device 180 uses the lane keeping function to recognize the lane marks from the camera image and then control the steering so as to travel near the center of the lane B. Then, when the intention to change lanes is confirmed and the subject vehicle reaches the lane change start point P, the control device 180 uses the lane change assist function to recognize the lane marks from the camera image, then calculate the travel trajectory for the lane change, and control the steering so that the position of the vehicle passes the target points on the travel trajectory. This allows the vehicle to move in the lateral direction so that the distance between the current position of the vehicle and the lane marks on the right side increases.

During the execution of the camera control, the control device 180 sets a control switching point on the branching road in preparation for switching from the camera control to the map control. The control switching point is set, for example, at the point of intersection between the center line between the right and left lane marks recognized from the camera image (or an extension line obtained by extending the center line) and the center line of the lane included in the map information (lane including the branching lane) (or an extension line obtained by extending the center line). Alternatively, the control switching point is set at a position at which the deviation is less than a predetermined length between the center line between the right and left lane marks recognized from the camera image (or an extension line obtained by extending the center line) and the center line of the lane included in the map information (lane including the branching lane) (or an extension line obtained by extending the center line). The control switching point is set at a position outside the unrecognizable area and on the center line of the lane B. In the example of FIG. 4A, the control switching point is set at the position of the lane change start point P. When the vehicle reaches the control switching point P (lane change start point P), the control device 180 switches from the camera control to the map control. After switching from the camera control to the map control, the autonomous control of the vehicle is executed so that the vehicle travels along the center line of the lane included in the road information A, and the vehicle travels in the branching lane.

While the vehicle is traveling in the unrecognizable area or after the vehicle has passed through the unrecognizable area, the control device 180 calculates the timing of switching from the map control to the camera control. While traveling in the unrecognizable area or after having passed through the unrecognizable area, the control device 180 calculates a target point (also referred to as a first target point, hereinafter) using the camera image. When the lane marks cannot be stably recognized from the camera image in the unrecognizable area, the first target point is calculated after a state is achieved in which the lane marks can be recognized. In addition, the control device 180 calculates a target point (also referred to as a second target point, hereinafter) using the road information A. Then, when the difference between the first target point and the second target point becomes a predetermined value or less, the control device 180 switches from the map control to the camera control.

As illustrated in FIG. 4B, a curve $C_L$ represents the travel trajectory calculated from the camera image, and a curve $M_L$ represents the travel trajectory calculated from the map information (road information A). A first target point C is represented by a position $(X_c, Y_c)$, and a second target point M is represented by a position $(X_M, Y_M)$. On the assumption that the current position of the vehicle is the point of origin, an angle $(\theta_C)$ formed between the X-axis and the line segment connecting the point of origin and the first target point C is calculated. In addition, also on the assumption that the current position of the vehicle is the point of origin, an angle (OM) formed between the X-axis and the line segment connecting the point of origin and the second target point M is calculated. The angles $(\theta_C, \theta_M)$ are calculated by the following equations (1) and (2).

[Equation 1]
$$\theta_C = \arctan(Y_c / X_c) \qquad (1)$$

[Equation 2]
$$\theta_M = \arctan(Y_m / X_m) \qquad (2)$$

By subtracting the angle $(\theta_M)$ from the angle $(\theta_C)$, the difference between the first target point and the second target point is calculated. The difference is calculated as an absolute value. Then, the calculated difference is compared with a preliminarily set threshold $(\Delta\theta_{th})$. That is, the control device 180 determines whether or not the condition of the following equation (3) is satisfied.

[Equation 3]
$$|\theta_C - \theta_M| \leq \Delta\theta_{th} \qquad (3)$$

When the absolute value of the calculated difference is not more than the threshold $(\Delta\theta_{th})$, the control device 180 switches from the map control to the camera control and autonomously controls the vehicle so that the position of the vehicle passes the first target point.

In the example of FIG. 4B, the difference between the angle $(\theta_{C1})$ calculated for the first target point $C_1$ and the angle $(\theta_{M1})$ calculated for the second target point $M_1$ is larger than the threshold $(\Delta\theta_{th})$. Accordingly, at the timing when the second target point $M_1$ is calculated, the control device 180 continues the map control. The difference between the angle $(\theta_{C2})$ calculated for the first target point $C_2$ and the angle $(\theta_{M2})$ calculated for the second target point $M_2$ is smaller than the threshold $(\Delta\theta_{th})$. Accordingly, at the timing when the subject vehicle passes the first target point $C_2$, the control device 180 switches from the map control to the camera control. Through this operation, it is possible to prevent the behavior of the vehicle from becoming large when switching from the map control to the camera control.

Figure 5:
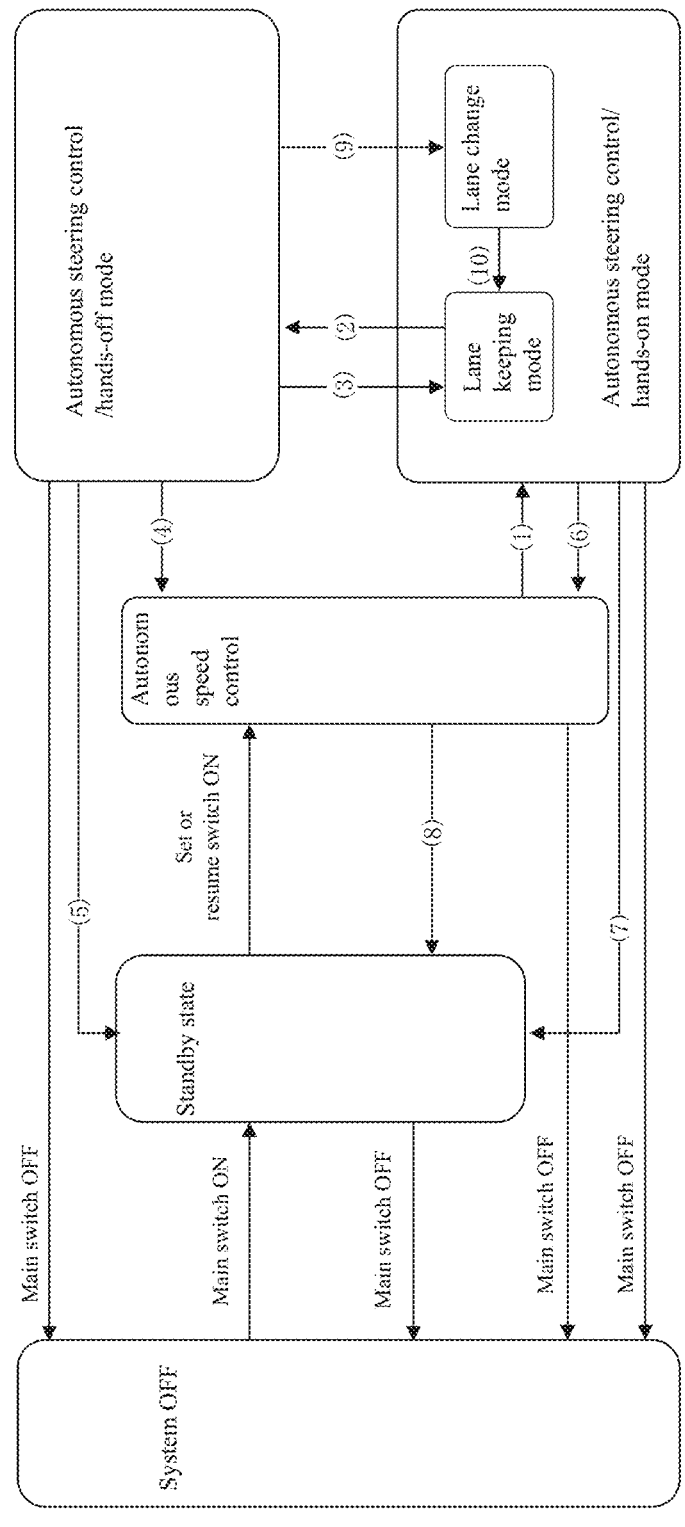
FIG. 5 is a block diagram illustrating a state transition of the control device of FIG. 1.

FIG. 5 is a block diagram illustrating a state transition of each function established in the control device 18. In the figure, the system means an autonomous travel control system realized by the control device 18. When the main switch 161 of FIG. 2 is turned ON from the system OFF state illustrated in the figure, the system comes to a standby state. From this standby state, the autonomous speed control is activated by turning ON the set/coast switch 163 or resume/acceleration switch 162 of FIG. 2. This allows the above-described constant speed control or inter-vehicle distance control to be started, and the driver can drive the subject vehicle simply by operating the steering wheel without stepping on the accelerator or the brake.

During the execution of the autonomous speed control, when the condition (1) of FIG. 5 is satisfied, the mode transitions to the lane keeping mode of the autonomous steering control/hands-on mode. Examples of the condition (1) include, but are not limited to, a condition in which all of the following conditions are satisfied: lane marks on both sides of the subject vehicle are being detected; the driver is holding the steering wheel; the vehicle is traveling near the center of the lane; the blinkers are not operating; the windshield wiper is not operating at a high speed (HI); and when a high-precision map is provided, there is not a tollgate, an exit, a merging point, an intersection, or a point at which the number of lanes decreases, within about 200 m ahead. The hands-on mode refers to a mode in which the autonomous steering control does not operate unless the driver holds the steering wheel, while the hands-off mode refers to a mode in which the autonomous steering control operates even when the driver releases the steering wheel.

During the execution of the lane keeping mode of the autonomous steering control/hands-on mode, when the condition (2) of FIG. 5 is satisfied, the mode transitions to the lane keeping mode of the autonomous steering control/hands-off mode. Examples of the condition (2) include, but are not limited to, a condition in which all of the following conditions are satisfied: the subject vehicle is traveling on an automobile road; the vehicle is traveling on a road that is structurally separated from the oncoming lane; the vehicle is traveling on a road for which a high-precision map is prepared; the vehicle is traveling at a speed not higher than the speed limit; GPS signals are effective; the driver is holding the steering wheel; the driver is facing forward; there is not a tollgate, an exit, a merging point, an intersection, or a point at which the number of lanes decreases, within about 800 m ahead; there is not a sharp curve of 100R or less within about 500 m ahead; the vehicle is not traveling in a tunnel that exceeds 500 m from the tunnel entrance; and the accelerator pedal is not depressed.

On the contrary, during the execution of the lane keeping mode of the autonomous steering control/hands-off mode, when the condition (3) of FIG. 5 is satisfied, the mode transitions to the lane keeping mode of the autonomous steering control/hands-on mode. Examples of the condition (3) include, but are not limited to, a condition in which any of the following conditions is satisfied: the subject vehicle is traveling on a road other than an automobile road; the vehicle is traveling in a two-way traffic section; the vehicle is traveling on a road for which no high-precision map is prepared; the vehicle is traveling at a speed higher than the speed limit; GPS signals can no longer be received; the driver does not face forward within 5 seconds after a forward gaze alarm is activated; the driver monitor camera can no longer detect the driver; there is any of a tollgate, an exit, a merging point, an intersection, or a point at which the number of lanes decreases, within about 800 m ahead; when traveling at a vehicle speed of less than about 40 km/h, there is a sharp curve of 100R or less within about 200 m ahead; when traveling at a vehicle speed of about 40 km/h or more, there is a sharp curve of 170R or less within about 200 m ahead; the vehicle is traveling in a tunnel that exceeds 500 m from the tunnel entrance; the driver has stepped on the accelerator pedal while holding the steering wheel; and an approaching alarm has operated.

During the execution of the lane keeping mode of the autonomous steering control/hands-off mode, when the condition (4) of FIG. 5 is satisfied, the autonomous steering control is stopped and transitions to the autonomous speed control. Examples of the condition (4) include, but are not limited to, a condition in which any of the following conditions is satisfied: lane marks on both sides of the subject vehicle are no longer detected for a certain period of time; the driver has operated the steering wheel; and the windshield wiper has operated at a high speed (HI). During the execution of the lane keeping mode of the autonomous steering control/hands-off mode, when the condition (5) of FIG. 5 is satisfied, the autonomous steering control and the autonomous speed control are stopped and transition to the standby state. Examples of the condition (5) include, but are not limited to, a condition in which any of the following conditions is satisfied: the driver has operated the brake; the driver has operated the cancel switch 164 of FIG. 2; one or more doors of the subject vehicle have opened; the driver's seat belt has been released; the seating sensor has detected that the driver is no longer on the driver's seat; the select lever has come to other than "D" or ""M"; the parking brake has been operated; the antiskid brake system of the vehicle has been turned OFF; the antiskid brake system has operated; the snow mode has been turned ON; the emergency brake has operated; the stop state continues for about 3 minutes after the vehicle has stopped due to the vehicle speed control; the front camera has detected poor visibility such as being unable to correctly recognize an object due to dirt, backlight, rain/fog, or the like; the front radar has detected shielding or radio disturbance; the front radar has detected an axis deviation; the side radar has detected shielding or radio disturbance; and the side radar has detected an axis deviation.

During the execution of the autonomous steering control/hands-on mode, when the condition (6) of FIG. 5 is satisfied, the autonomous steering control is stopped and transitions to the autonomous speed control. Examples of the condition (6) include, but are not limited to, a condition in which any of the following conditions is satisfied: lane marks on both sides of the subject vehicle are no longer detected; the driver has operated the steering wheel; the driver has operated the blinkers; the windshield wiper has operated at a high speed (HI); the vehicle has come to a tollgate section when a high-precision map is prepared; and the front camera has detected poor visibility such as being unable to correctly recognize an object due to dirt, backlight, rain/fog, or the like. During the execution of the autonomous steering control/hands-on mode, when the condition (7) of FIG. 5 is satisfied, the autonomous steering control and the autonomous speed control are stopped and transition to the standby state. Examples of the condition (7) include, but are not limited to, a condition in which any of the following conditions is satisfied: the driver has operated the brake; the driver has operated the cancel switch 164 of FIG. 2; one or more doors of the subject vehicle have opened; the driver's seat belt has been released; the seating sensor has detected that the driver is no longer on the driver's seat; the select lever has come to other than "D" or ""M"; the parking brake has been operated; the antiskid brake system of the vehicle has been turned OFF; the antiskid brake system has operated; the snow mode has been turned ON; the emergency brake has operated; the stop state continues for about 3 minutes after the vehicle has stopped due to the vehicle speed control; the front radar has detected shielding or radio disturbance; and the front radar has detected an axis deviation.

During the execution of the autonomous speed control, when the condition (8) of FIG. 5 is satisfied, the control transitions to the standby state. Examples of the condition (8) include, but are not limited to, a condition in which any of the following conditions is satisfied: the driver has operated the brake; the driver has operated the cancel switch 164 of FIG. 2; one or more doors of the subject vehicle have opened; the driver's seat belt has been released; the seating sensor has detected that the driver is no longer on the driver's seat; the select lever has come to other than "D" or ""M"; the parking brake has been operated; the antiskid brake system of the vehicle has been turned OFF; the antiskid brake system has operated; the snow mode has been turned ON; the emergency brake has operated; the stop state continues for about 3 minutes after the vehicle has stopped due to the vehicle speed control; the front radar has detected shielding or radio disturbance; and the front radar has detected an axis deviation.

During the execution of the lane keeping mode of the autonomous steering control/hands-off mode, when the condition (9) of FIG. 5 is satisfied, the mode transitions to a lane change mode of the autonomous steering control/hands-on mode. Examples of the condition (9) include, but are not limited to, a condition in which any of the following conditions is satisfied: when the system has proposed a lane change, the driver has pressed the lane change assist switch 166 of FIG. 2; and the driver has operated the blinkers.

During the execution of the lane change mode of the autonomous steering control/hands-on mode, when the condition (10) of FIG. 5 is satisfied, the mode transitions to the lane keeping mode of the autonomous steering control/hands-on mode. Examples of the condition (10) include, but are not limited to, a condition in which any of the following conditions is satisfied: the speed limit has been exceeded before the start of a lane change performance (abbreviated as LCP, hereinafter); the driver has stepped on the accelerator pedal while holding the steering wheel before the start of the LCP; the LCP can no longer be started within 10 seconds after pressing the lane change assist switch 166 during the proposal of a lane change when there is a slow car ahead; the LCP can no longer be started and the vehicle has come too close to the branching point after pressing the lane change assist switch 166 during the proposal of a lane change to travel along the route; a lane change maneuver (abbreviated as LCM, hereinafter) can no longer be started within 5 seconds after the LCP has operated; the vehicle speed has fallen below about 50 km/h after starting the LCP and before starting the LCM; there is no longer a space in the adjacent lane required to change lanes after operating the LCP and before starting the LCM; the driver has performed a cancel operation before starting the LCM; lane marks can no longer be detected before starting the LCM; a determination has been made before starting the LCM that there is no adjacent lane in the direction of changing lanes or there will be no adjacent lane within a certain distance ahead; a determination has been made before starting the LCM that there is a curve with a radius of curvature of 250 m or less within a certain distance ahead; a determination has been made before starting the LCM that there is a section within a certain distance ahead in which the type of lane marking prohibits a lane change to the adjacent lane; the side radar has detected shielding or radio disturbance before starting the LCM; the side radar has detected an axis deviation before starting the LCM; a hands-on alarm has operated (this condition is established when any of the following conditions is satisfied: the driver does not hold the steering wheel within about 2 seconds after the LCP has operated; the driver does not hold the steering wheel within about 2 seconds after pressing the lane change assist switch 166 during the proposal of a lane change when there is a slow car ahead; and the driver does not hold the steering wheel within about 2 seconds after pressing the lane change assist switch 166 during the proposal of a lane change to travel along the route); the driver has turned off the blinkers; and the LCP has been completed.

The system is turned OFF when the main switch 161 is turned OFF in any of the autonomous steering control/hands-off mode, the autonomous steering control/hands-on mode, the autonomous speed control, and the standby state.

Figure 6A:
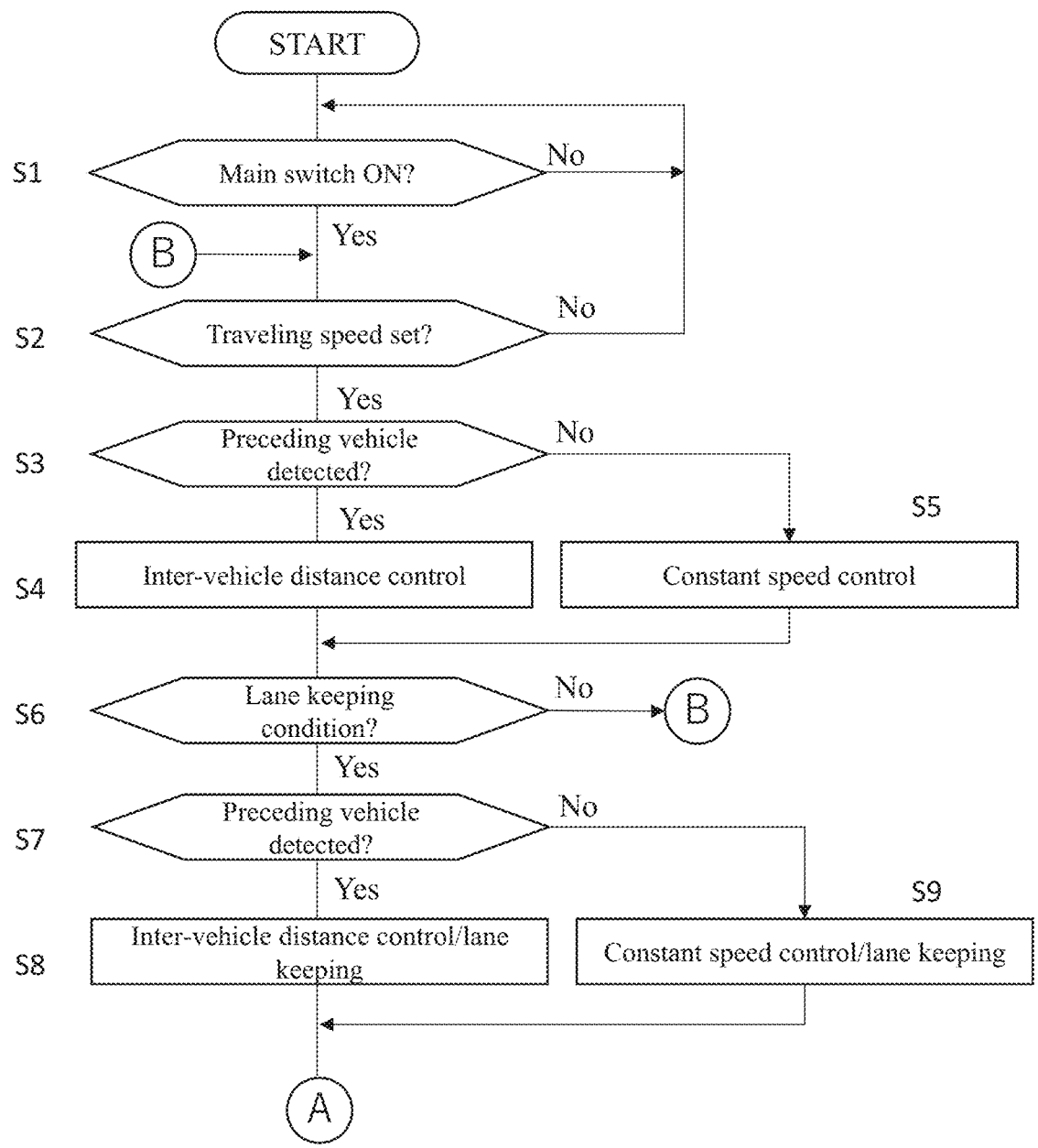
FIG. 6A is a flowchart (part 1) illustrating a travel control process of the travel control apparatus for a vehicle according to the present invention.
Figure 6B:
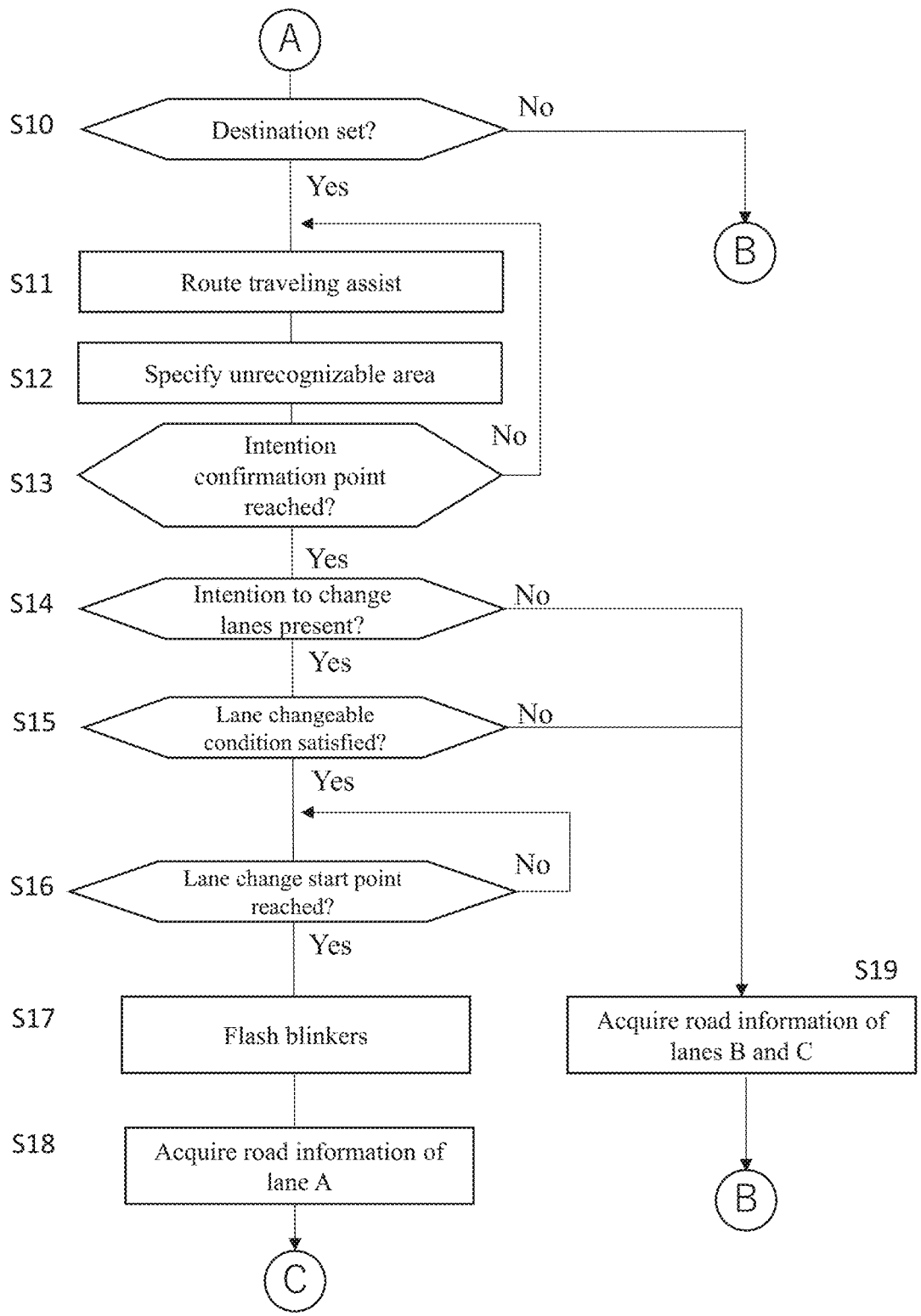
FIG. 6B is a flowchart (part 2) illustrating the travel control process of the travel control apparatus for a vehicle according to the present invention.
Figure 6C:
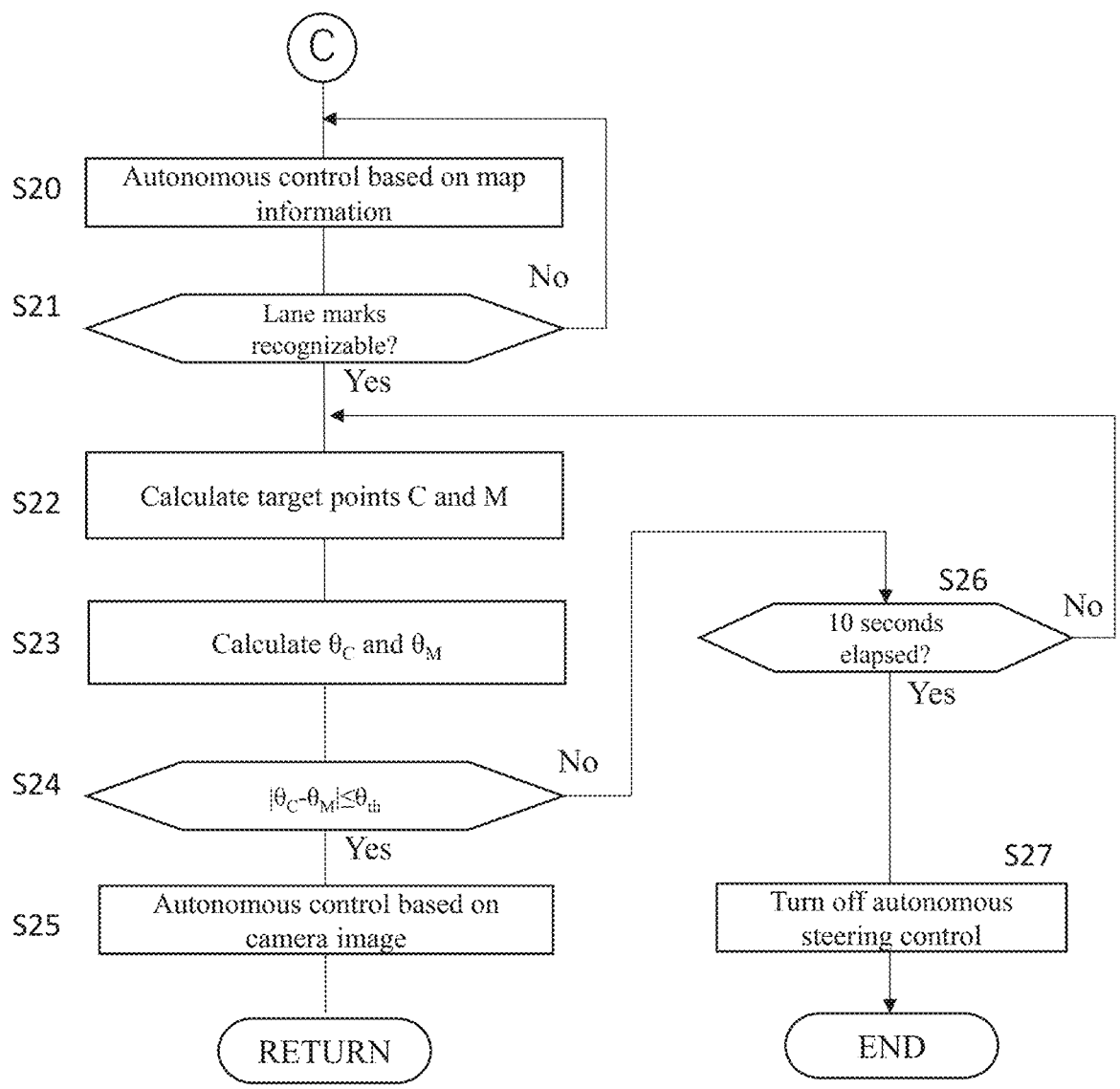
FIG. 6C is a flowchart (part 3) illustrating the travel control process of the travel control apparatus for a vehicle according to the present invention.

The travel control process according to the present embodiment will then be described with reference to FIGS. 6A to 6C. FIGS. 6A to 6C are flowcharts illustrating the travel control process according to the present embodiment. The control device 18 executes the travel control process, which will be described below, at predetermined time intervals. The following description will be made on the assumption that the control device 18 uses the autonomous travel control function to execute the autonomous speed control and the autonomous steering control and the subject vehicle travels along a route that requires a lane change to travel along the travel route because of approaching an interchange while the lane keeping control for controlling the traveling position of the subject vehicle in the width direction is performed so that the subject vehicle travels in the lane at a speed that is set by the driver.

First, in step S1 of FIG. 6A, a determination is made as to whether or not the main switch 161 of the control device 18 is ON, and when the main switch 161 is OFF, step S1 is repeated until the main switch 161 is turned ON. When the main switch 161 is ON, the process proceeds to step S2, in which a determination is made as to whether or not the traveling speed is set by the driver. When the traveling speed is not set, the process returns to step S1, from which steps S1 and S2 are repeated until the traveling speed is set. The setting of the traveling speed is performed by the driver operating the resume/acceleration switch 162 or set/coast switch 163 of the input device 16 illustrated in FIG. 2 to input a desired traveling speed.

When the traveling speed is set, the autonomous speed control is started. In step S3, the front radar (of the sensors 11) which detects an obstacle ahead of the subject vehicle is used to detect whether or not there is a preceding vehicle ahead of the subject vehicle in its travel lane, and when there is a preceding vehicle, the process proceeds to step S4, in which the inter-vehicle distance control is executed, while when there is no preceding vehicle, the process proceeds to step S5, in which the constant speed control is executed. This allows the driver to drive the subject vehicle at a desired speed simply by operating the steering wheel without stepping on the accelerator or the brake.

During the execution of the inter-vehicle distance control in step S4 or the constant speed control in step S5, a determination is made in step S6 as to whether or not the above-described condition (1) for transitioning to the lane keeping mode of the autonomous steering control/hands-on mode is satisfied. When the condition (1) is satisfied, the process proceeds to step S7, while when the condition (1) is not satisfied, the process returns to step S2.

In step S7, the front radar (of the sensors 11) which detects an obstacle ahead of the subject vehicle is used to detect whether or not there is a preceding vehicle ahead of the subject vehicle in its travel lane, and when there is a preceding vehicle, the process proceeds to step S8, in which the inter-vehicle distance control/lane keeping mode is executed, while when there is no preceding vehicle, the process proceeds to step S9, in which the constant speed control/lane keeping mode is executed. The autonomous control in step S8 or S9 is control based on the camera image.

During the execution of the inter-vehicle distance control/lane keeping mode in step S8 or the constant speed control/lane keeping mode in step S9, a determination is made in the subsequent step S10 of FIG. 6B as to whether or not a destination is set. When a destination is not set, the process returns to step S2 of FIG. 6A. When a destination is set, the process proceeds to step S11, in which the route traveling assist is executed. In the route traveling assist, when it is necessary to change lanes in order to travel along the travel route, a lane change start point and an intention confirmation point for confirming the intention to change lanes are set. In step S12, the map information stored in the map database 13 is referred to, and an unrecognizable area is specified on the travel route. In this operation, when the lane change start point is included in the unrecognizable area, the lane change start point is set again so as to be outside the unrecognizable area. In step S13, a determination is made as to whether or not the current position of the vehicle has reached the intention confirmation point, and when the current position of the vehicle has not reached the intention confirmation point, the process returns to step S11, while when the current position of the vehicle has reached the intention confirmation point, a display screen is displayed on the display to confirm the driver's intention as to whether or not to perform the lane change.

In step S14, a determination is made as to whether or not there is an intention to change lanes. When the driver operates the acceptance switch after the display is displayed, a determination is made that there is an intention to change lanes, and the process proceeds to step S15, while when the acceptance switch is not operated, a determination is made that there is no intention to change lanes, and the process proceeds to step S19.

In step S15, a determination is made as to whether or not a lane changeable condition is satisfied. The lane changeable condition is the condition (9) illustrated in FIG. 5. However, when the condition (9) of FIG. 5 includes a condition that the lane marks are recognized and a condition that the adjacent lane includes a space necessary for the lane change, these conditions are excluded from the lane changeable condition to be set in the determination process of step S15. When the lane changeable condition is satisfied, the process proceeds to step S16, while when the lane changeable condition is not satisfied, the process proceeds to step S19.

In step S16, a determination is made as to whether or not the current position of the vehicle has reached the lane change start point, and when the current position of the vehicle has reached the lane change start point, the process proceeds to step S17, while when the current position of the vehicle has not reached the lane change start point, the process returns to step S16. When the vehicle travels so as not to follow the travel route before reaching the lane change start point (e.g., when the vehicle moves to a lane adjacent to the current travel lane), the process proceeds to step S19.

In step S17, the control device 180 starts flashing the blinkers. In step S18, the control device 180 acquires the road information of the lane A, which is the branching lane, among the road information stored in the second memory 18b, and the process proceeds to step S20. In the case in which the information on the branching lane has already been acquired when the current position of the vehicle reaches the intention confirmation point or the lane change start point, the road information of the lane A located ahead of the branching lane, for which the information has already been acquired, is acquired. In step S19, the control device 180 acquires the road information of the lanes B and C, which are included in the main road, among the road information stored in the second memory 18b, and the process returns to step S2 of FIG. 6A.

In step S20, the autonomous control based on the camera image is switched to the autonomous control based on the map information, and the lane change assist is executed. The lane change assist in step S20 is executed in the hands-on mode. In the autonomous control based on the map information, the target points M are calculated using the road information of the lane A, and the steering is controlled so that the vehicle passes the target points M. During the autonomous control based on the map information, the calculation of the target points M is repeatedly performed at a predetermined cycle, and the steering is controlled so that the vehicle passes each of the calculated target points M.

In step S21, a determination is made as to whether or not the lane marks can be recognized from the camera image, and when the lane marks can be recognized, the process proceeds to step S22, while when the lane marks cannot be recognized, the process returns to step S20. The determination in step S21 may be performed, for example, after a predetermined time elapses from the time point at which the autonomous control based on the camera image has been switched to the autonomous control based on the map information. The length of the predetermined time may be set equal to or longer than the length of time from the start to completion of the lane change. In step S22, the target points C and M are calculated. That is, each target point C is calculated in addition to each target point M. In step S23, the angles ($\theta c$, $\theta m$) are calculated. In step S24, the difference ($|\theta_C - \theta_M|$) between the first target point and the second target point is calculated, and a determination is made as to whether or not the calculated difference ($|\theta_C - \theta_M|$) is the threshold ($\Delta\theta_{th}$) or less. When the difference ($|\theta_C - \theta_M|$) is the threshold ($\Delta\theta th$) or less, the autonomous control based on the map information is switched to the autonomous control based on the camera image (S29). In the example of FIG. 4A, the lane change at the branching road is completed, and while the vehicle is traveling in the branching lane, the autonomous control based on the map information is switched to the autonomous control based on the camera image.

When the difference ($|\theta_C - \theta_M|$) is larger than the threshold ($\Delta\theta th$), a determination is made in step S26 as to whether or not a state in which the difference ($|\theta_C - \theta_M|$) is larger than the threshold ($\Delta\theta th$) continues for a predetermined time (e.g., 10 seconds). When the predetermined time (e.g., 10 seconds) has not elapsed, the process returns to step S22, while when the predetermined time (e.g., 10 seconds) has elapsed, the autonomous steering control is turned off and switched to the driver's steering operation. The control flow of step S20 and the subsequent steps is executed in the hands-on mode, and therefore when the automatic steering control is turned off in step S27, the driver is holding the steering wheel, and the driver can smoothly perform the steering operation. When a state in which the lane marks can be recognized from the camera image is achieved during the execution of the autonomous control based on the map information, if the map control is switched to the camera control in a state in which the difference between the first target point (target point C) and the second target point (target point M) is large, the behavior of the vehicle becomes large. In the present embodiment, therefore, when the state in which the difference between the first target point (target point C) and the second target point (target point M) is large continues for a predetermined time or more, the autonomous steering control is turned off and it is thereby possible to prevent the behavior of the vehicle from becoming large when the control is switched.

As described above, according to the travel control apparatus 1 and travel control method for a vehicle of the present embodiment, when the unrecognizable area is present on the travel route of the vehicle, the autonomous control based on the map image (corresponding to the "first autonomous control" of the present invention) is switched to the autonomous control based on the map information (corresponding to the "second autonomous control" of the present invention) before the vehicle enters the unrecognizable area. The autonomous control based on the camera image is autonomous control of the vehicle using the information recognized from the camera image, and the autonomous control based on the map information is autonomous control of the vehicle using the map information stored in the map database 13. This can prevent the behavior of the vehicle from becoming large due to the deviation of the target points when switching the mode of the autonomous control. As a result, the passengers' uncomfortable feeling due to the behavior of the vehicle can be prevented.

Moreover, according to the travel control apparatus 1 and travel control method for a vehicle of the present embodiment, when the difference between the first target point and the second target point is a predetermined value or less after switching from the first autonomous control to the second autonomous control, the second autonomous control is switched to the first autonomous control. This can prevent the behavior of the vehicle from becoming large when switching from the second autonomous control to the first autonomous control.

Furthermore, according to the travel control apparatus 1 and travel control method for a vehicle of the present embodiment, when a state in which the difference between the first target point and the second target point is larger than a predetermined value continues for a predetermined time or more after switching from the first autonomous control to the second autonomous control, the autonomous steering control function is turned off. This can prevent the map control from being switched to the camera control in the state in which the difference between the first target point and the second target point is large, and it is possible to prevent the behavior of the vehicle from becoming large.

In addition, according to the travel control apparatus 1 and travel control method for a vehicle of the present embodiment, when the difference between the first target point and the second target point is more than a predetermined value after switching from the first autonomous control to the second autonomous control, the second autonomous control is continued. This can prevent the map control from being switched to the camera control in the state in which the difference between the first target point and the second target point is large, and it is possible to prevent the behavior of the vehicle from becoming large.

DESCRIPTION OF REFERENCE NUMERALS

1 Travel control apparatus
11 Sensors
12 Subject vehicle position detection device
13 Map database
14 Onboard equipment
15 Presentation device
16 Input device
161 Main switch
162 Resume/acceleration switch
163 Set/coast switch
164 Cancel switch
165 Inter-vehicle distance adjustment switch
166 Lane change assist switch
167 Display screen
168 ON button
169 OFF button
17 Drive control device
18 Control device
18*a* First memory
18*b* Second memory
18*c* Data acquisition unit
18*d* Travel control unit

The invention claimed is:

1. A travel control method for controlling travel of a vehicle using a processor, the travel control method comprising:
   autonomously controlling the vehicle through operating an autonomous speed control function for autonomously controlling a traveling speed of the vehicle and an autonomous steering control function for autonomously controlling steering of the vehicle;
   executing first autonomous control in which when an external situation of the vehicle is recognizable from a captured image by a camera provided on the vehicle, the vehicle is autonomously controlled using information recognized from the captured image;
   executing second autonomous control in which information indicating the external situation of the vehicle is acquired from map information stored in a storage medium provided in the vehicle and the vehicle is autonomously controlled using the acquired information;
   specifying an unrecognizable area in which the external situation of the vehicle is unrecognizable from the captured image; and
   when the unrecognizable area is present on a travel route of the vehicle, switching from the first autonomous control to the second autonomous control at a position at which a deviation is less than a predetermined length between a center line between right and left lane marks recognized from the captured image and a center line of a lane include in the map information before the vehicle enters the unrecognizable area.

2. The travel control method according to claim 1, comprising:
   calculating a first target point positioned on a target trajectory of the vehicle using the information recognized from the captured image;
   executing the first autonomous control so that a position of the vehicle passes the first target point;
   calculating a second target point positioned on the target trajectory of the vehicle using the information acquired from the map information;
   executing the second autonomous control so that the position of the vehicle passes the second target point; and
   when a difference between the first target point and the second target point is a predetermined value or less after switching from the first autonomous control to the second autonomous control, switching from the second autonomous control to the first autonomous control.

3. The travel control method according to claim 1, comprising:
   calculating a first target point positioned on a target trajectory of the vehicle using the information recognized from the captured image;

executing the first autonomous control so that a position of the vehicle passes the first target point;
calculating a second target point positioned on the target trajectory of the vehicle using the information acquired from the map information;
executing the second autonomous control so that the position of the vehicle passes the second target point; and
when a state in which a difference between the first target point and the second target point is larger than a predetermined value continues for a predetermined time or more after switching from the first autonomous control to the second autonomous control, turning off the autonomous steering control function.

4. The travel control method according to claim 1, comprising:
calculating a first target point positioned on a target trajectory of the vehicle using the information recognized from the captured image;
executing the first autonomous control so that a position of the vehicle passes the first target point;
calculating a second target point positioned on the target trajectory of the vehicle using the information acquired from the map information;
executing the second autonomous control so that the position of the vehicle passes the second target point; and
when a difference between the first target point and the second target point is more than a predetermined value after switching from the first autonomous control to the second autonomous control, continuing the second autonomous control.

5. A travel control apparatus comprising:
a storage medium configured to store map information; and
a controller configured to control travel of a vehicle, the controller operating to:
autonomously control the vehicle through operating an autonomous speed control function for autonomously controlling a traveling speed of the vehicle and an autonomous steering control function for autonomously controlling steering of the vehicle;
execute first autonomous control in which when an external situation of the vehicle is recognizable from a captured image by a camera provided on the vehicle, the vehicle is autonomously controlled using information recognized from the captured image;
execute second autonomous control in which information indicating the external situation of the vehicle is acquired from map information stored in a storage medium provided in the vehicle and the vehicle is autonomously controlled using the acquired information;
specify an unrecognizable area in which the external situation of the vehicle is unrecognizable from the captured image; and
when the unrecognizable area is present on a travel route of the vehicle, switch from the first autonomous control to the second autonomous control at a position at which a deviation is less than a predetermined length between a center line between right and left lane marks recognized from the captured image and a center line of a lane included in the map information before the vehicle enters the unrecognizable area.

6. A travel control method for controlling travel of a vehicle using a processor, the travel control method comprising:
autonomously controlling the vehicle through operating an autonomous speed control function for autonomously controlling a traveling speed of the vehicle and an autonomous steering control function for autonomously controlling steering of the vehicle;
executing first autonomous control in which when an external situation of the vehicle is recognizable from a captured image by a camera provided on the vehicle, the vehicle is autonomously controlled using information recognized from the captured image;
executing second autonomous control in which information indicating the external situation of the vehicle is acquired from map information stored in a storage medium provided in the vehicle and the vehicle is autonomously controlled using the acquired information;
specifying an unrecognizable area in which the external situation of the vehicle is unrecognizable from the captured image; and
when the unrecognizable area is present on a travel route of the vehicle, switching from the first autonomous control to the second autonomous control at a position of intersection between right and left lane marks recognized from the captured image and a center line of a lane included in the map information before the vehicle enters the unrecognizable area.

* * * * *